(12) United States Patent
Koenig et al.

(10) Patent No.: US 11,730,088 B2
(45) Date of Patent: Aug. 22, 2023

(54) PLANT HOLD-DOWN BRACKET

(71) Applicants: Tate Koenig, Aurora, OR (US); Chad Sobella, Boring, OR (US)

(72) Inventors: Tate Koenig, Aurora, OR (US); Chad Sobella, Boring, OR (US)

(*) Notice: Subject to any disclaimer, the term of this patent is extended or adjusted under 35 U.S.C. 154(b) by 92 days.

(21) Appl. No.: 17/398,642

(22) Filed: Aug. 10, 2021

(65) Prior Publication Data
US 2023/0050104 A1 Feb. 16, 2023

(51) Int. Cl.
*A01G 9/12* (2006.01)

(52) U.S. Cl.
CPC .................... *A01G 9/128* (2013.01)

(58) Field of Classification Search
CPC ... A01G 9/128; A01G 2017/165; A01G 17/08
USPC ..... 47/47; 248/229.11, 229.21, 230.1, 230.2, 248/231.31, 249, 328
See application file for complete search history.

(56) References Cited

U.S. PATENT DOCUMENTS

| | | | | |
|---|---|---|---|---|
| 5,669,536 A * | 9/1997 | Wang | ........................ | B62H 5/00 |
| | | | | 248/292.12 |
| 5,735,499 A * | 4/1998 | Phillips | ................... | F16M 13/02 |
| | | | | 248/316.4 |
| 7,997,546 B1 * | 8/2011 | Andersen | .................. | F16B 2/06 |
| | | | | 248/230.8 |
| 2016/0029575 A1 * | 2/2016 | Marke | ..................... | A01G 9/128 |
| | | | | 47/44 |
| 2017/0142914 A9 * | 5/2017 | Marke | ..................... | A01G 17/04 |

FOREIGN PATENT DOCUMENTS

| CN | 108293512 A | * | 7/2018 | ............. A01G 17/08 |
|---|---|---|---|---|
| EP | 1342404 A2 | * | 9/2003 | ............. A01G 17/12 |
| FR | 2834860 A1 | * | 7/2003 | ............. A01G 17/08 |
| KR | 101602707 B1 | * | 3/2016 | ............. A01G 17/04 |

* cited by examiner

*Primary Examiner* — David J Parsley
*Assistant Examiner* — Danielle A Clerkley
(74) *Attorney, Agent, or Firm* — Mark S Hubert

(57) ABSTRACT

A convertible, plant securement device intended for nurseries and horticulturalists to secure potted and non-potted plants and trees from tipping over as well as securing their watering lines. The device may be used with a vertical ground stake such as a section of steel rebar wherein it has a horizontal hook that catches over the edge of a pot to secure it to the ground. Alternatively, it may be rotated 90 degrees and secured to a trellis wire and then strapped around the stock or trunk of a tree to keep it vertical and upright.

10 Claims, 8 Drawing Sheets

PLANT HOLD-DOWN BRACKET

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to horticulture, and more particularly to a device to secure potted, bagged and non-potted plants in their vertically upright position by anchoring the device to the ground or a trellis wire.

BACKGROUND

Nurseries and horticulturalists grow their plants in high volumes and in confined areas to minimize costs and maximize profits as there is a small profit margin on these goods. Their plant starts grow to a plantable size in pots which are arranged in an efficient spatial organization to be able to be watered, receive sunlight and be individually removed. Generally, these plant starts remain outside, subject to the elements and secured by tying to a horizontal wire trellis or by just the mass of the potting soil in the pot. Often the wind and/or rain knock over these starts which may individually fall or may tip over all the nearby plants in a domino effect. This event can damage or kill these plants. Either outcome results in a loss of revenue.

What is needed is an economical, quick and easy device for securing these plants in their vertical position regardless of their size or the size of the pot they are growing in. Additionally. it would be an added benefit if the size of the pot and mass of potting soil could be minimized to reduce the nursery's overhead, and if any additional parts needed to secure the plants could be off the shelf, inexpensive components, found anywhere or readily fabricated.

Henceforth, an economical single device that quickly and simply allows the securement of any size of plant start to the ground or to an existing wire trellis would fulfill a long felt need in the horticulture industry. This new invention utilizes and combines known and new technologies in a unique and novel configuration to overcome the aforementioned problems and accomplish this.

BRIEF SUMMARY

In accordance with various embodiments, a plant hold-down bracket is provided.

In one aspect, a multipurpose bracket that may be used to securely hold down any size of potted or bagged plant, including trees by their pot or stem/stalk/trunk, utilizing a ground stake or a trellis wire.

In another aspect, a height adjustable potted plant hold-down bracket adapted to a plethora of securement methods for preventing the tipping over of the potted plant.

In another aspect, a height adjustable potted or bagged plant hold-down bracket that once set into the ground with its stake, need not be removed to take out or replace a potted plant. The bracket may simply be raised on the stake to accommodate that function.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
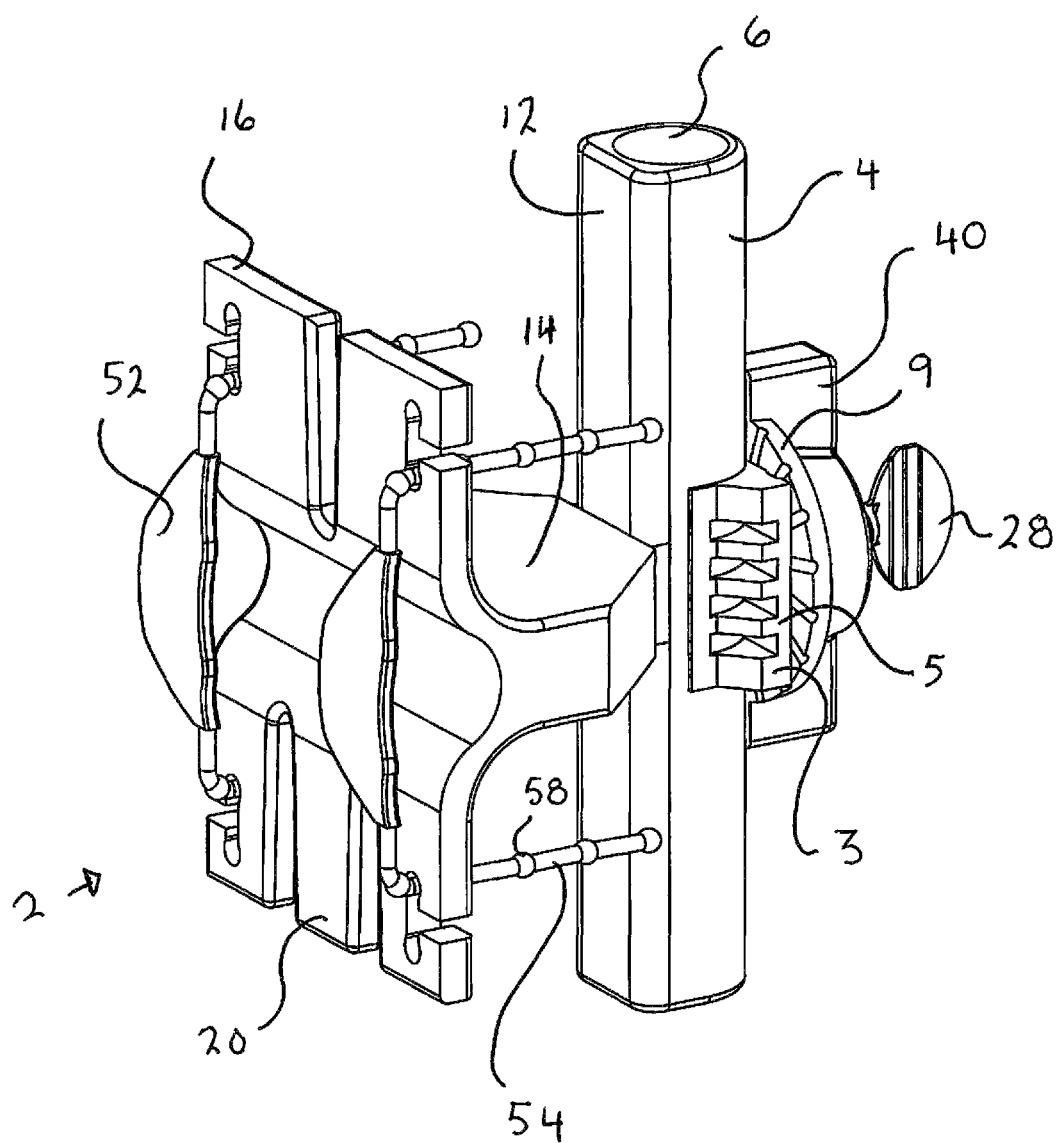
FIG. 1 is a rear side perspective view of the plant hold-down bracket with the vertical adjustment thumbscrew, the trellis wire lock wingnut and two plant securement ties.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. Depending on the orientation and method of securement, the plant hold-down bracket may or may not utilize the vertical adjustment thumbscrew, the trellis wire lock wingnut and at least one plant securement tie. It should thus be appreciated that the features described with respect to one embodiment may or may not be incorporated with other embodiments as well.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "stem" refers to the plant stalk or trunk as the plant may be a sapling, shrub or flower.

The present invention relates to a novel design for a plant hold-down bracket that can be used in conjunction with a vertical ground stake to secure the plant pot from tipping over or rotatable by 90 degrees so as to be converted to be used with a horizontal trellis wire.

Figure 6:
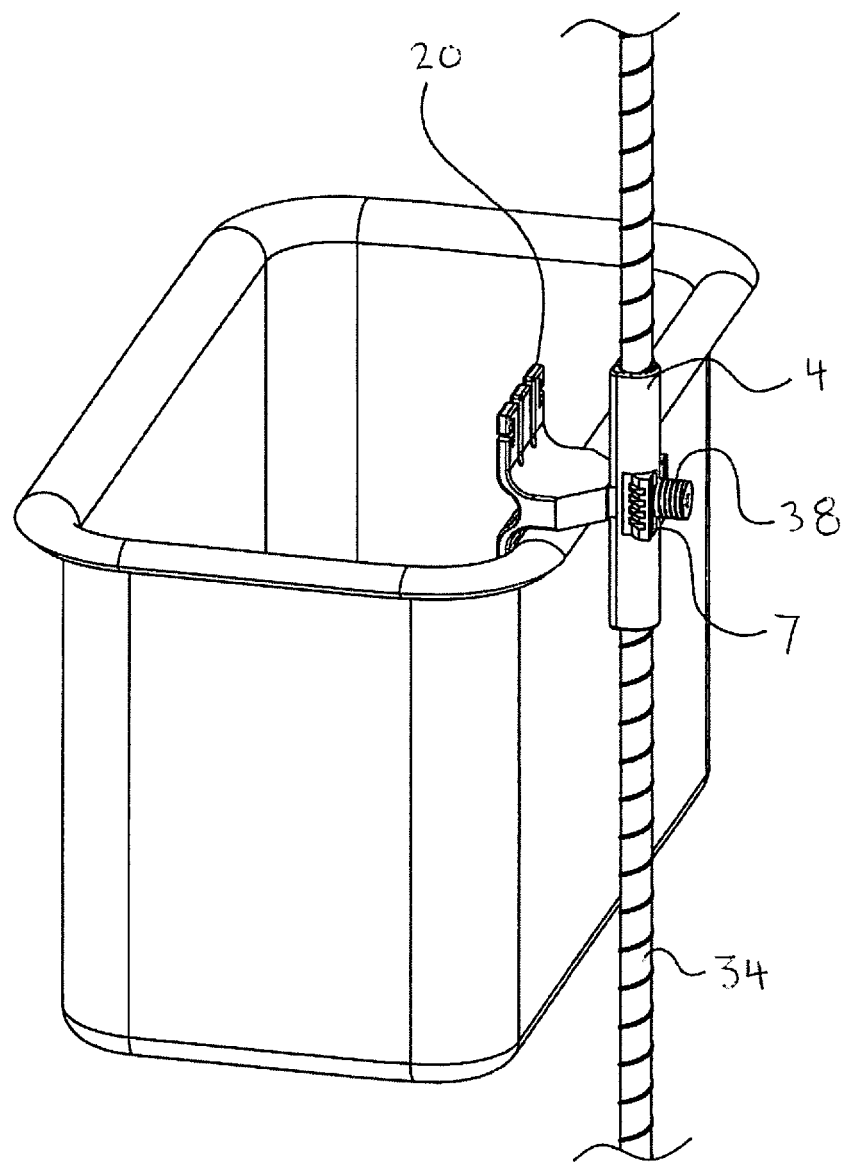
FIG. 6 is a side perspective view of the plant hold-down bracket installed vertically onto a plant pot.

Looking at FIGS. 1 and 6 the plant hold-down bracket 2 can be seen with all of the possible components for the use of the bracket 2 in the vertical or horizontal orientations. The bracket 2 has a right cylindrical body 4 with a bore 6 having a contiguous inner wall traversing therethrough, centered about cylindrical body's linear axis. There is a wire locking platform 3 with a grooved planar top face 5 formed at the approximate midpoint of the body 4. Across the top face of the platform 3 and running parallel to the linear axis of the body 4 are linear grooves 7. At the approximate center of the platform 3 there extends an externally and internally threaded, perpendicular stud 8. Extending perpendicularly from the back face 12 of the body 4 is a spacer block 14 that holds a bracket plate 16 at a spaced distance off of the body 4. The plane of the rear face 20 of the bracket plate 16 resides parallel to the plane of the platform 3 but at a distance sufficient to allow tactile manipulation of any plant securement ties between the body 4 and the plate 16.

Figure 2:
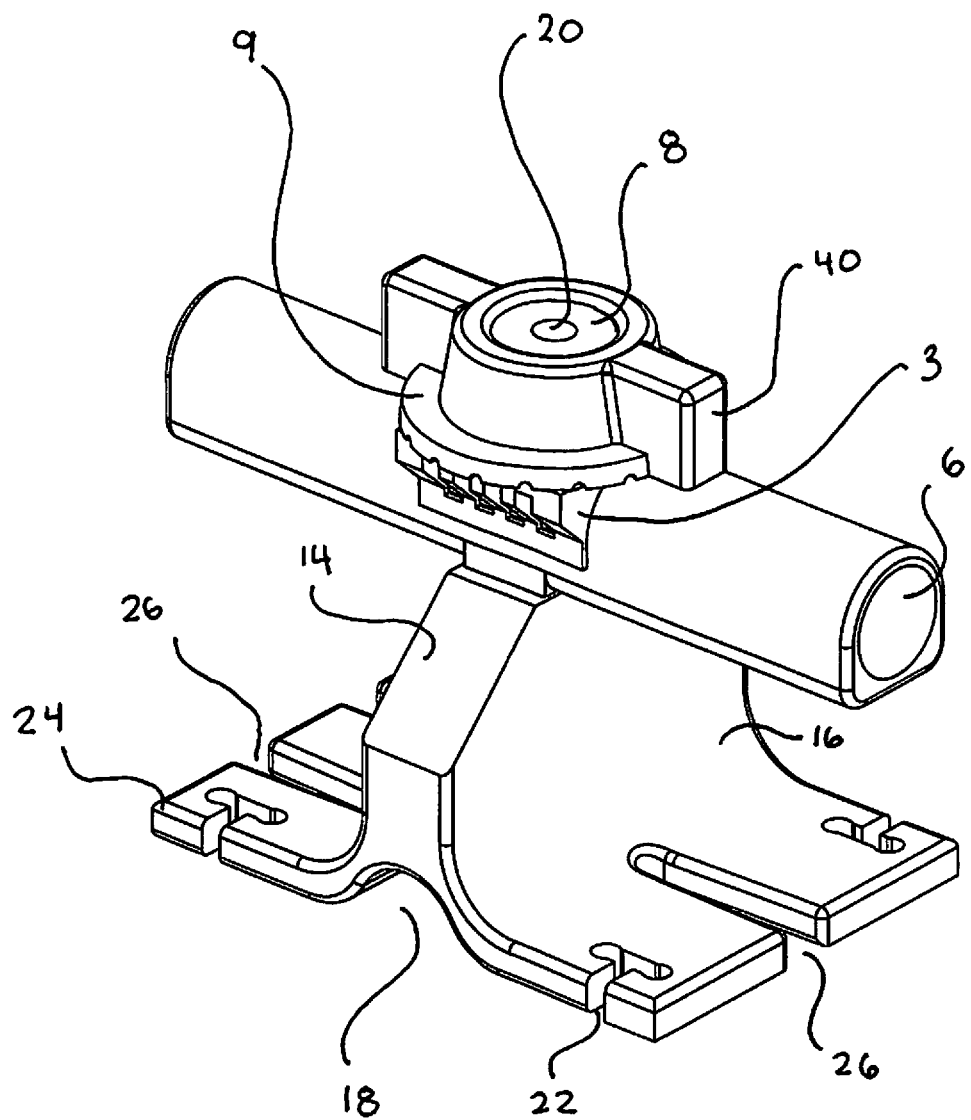
FIG. 2 is a bottom side perspective view of the plant hold-down bracket with the trellis wire lock wingnut.
Figure 3:
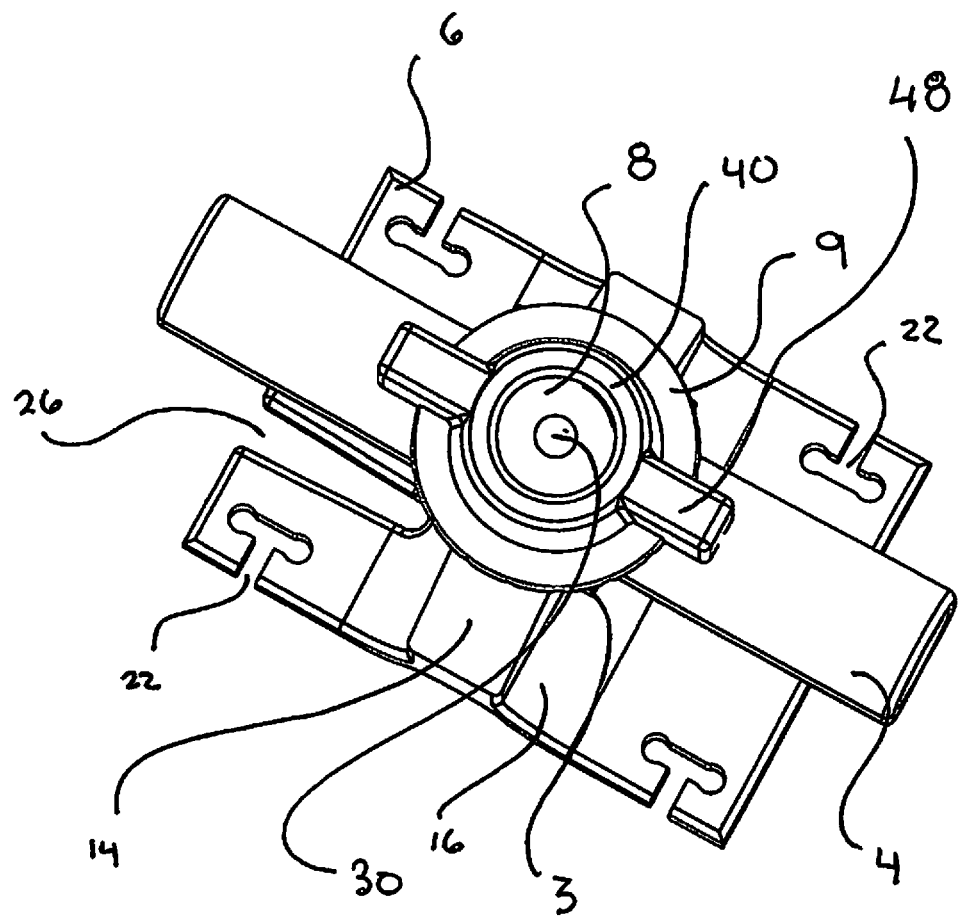
FIG. 3 is a front view of the plant hold-down bracket with the trellis wire lock wingnut.
Figure 4:
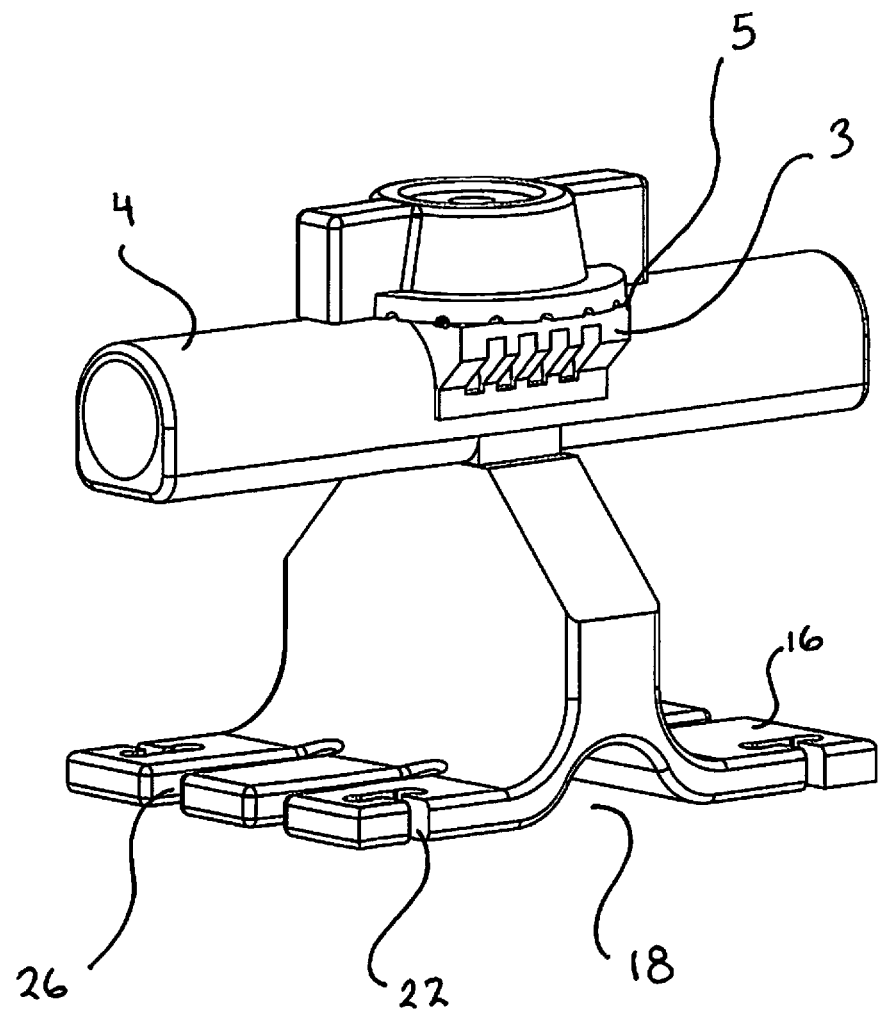
FIG. 4 is a top side perspective view of the plant hold-down bracket with the trellis wire lock wingnut.

Looking at FIGS. 2, 3 and 4 it can best be seen that the bracket plate 16 is generally planar and rectangular in shape, with a central concave linear depression 18 running along its entire width so as to reside perpendicular to the linear axis of the body 4. The rear face 20 of the bracket plate 16 is generally planar except for its central depression 18. (FIG. 1) The bracket plate 16 also has T shaped slots 22 extending through its thickness with one adjacent to each of its four corners 24. There are also three offset V slots 26 cut into opposing sides of the bracket plate 16 that extend from the outer edge of the bracket plate to the spacer block 14. These are used to secure the plant's waterlines. One side has two V slots and the other side has one V slot. They are tapered so as to lock in different diameter and different manufacturer's irrigation lines.

On FIG. 1 it can be seen that there is a vertical adjustment thumbscrew 28 (FIGS. 7 and 9) that threading engages the threaded internal through-bore 30 (FIGS. 2 and 3) of the stud 8. The thumbscrew 28 has an externally threaded shaft 32 that has a length that exceeds the length of the through-bore 30 so as to be able to extend perpendicularly into the bore 6, thereby frictionally engaging any ground stake 34 (FIG. 6) inserted into the bore 6 of the body 4.

Figure 7:
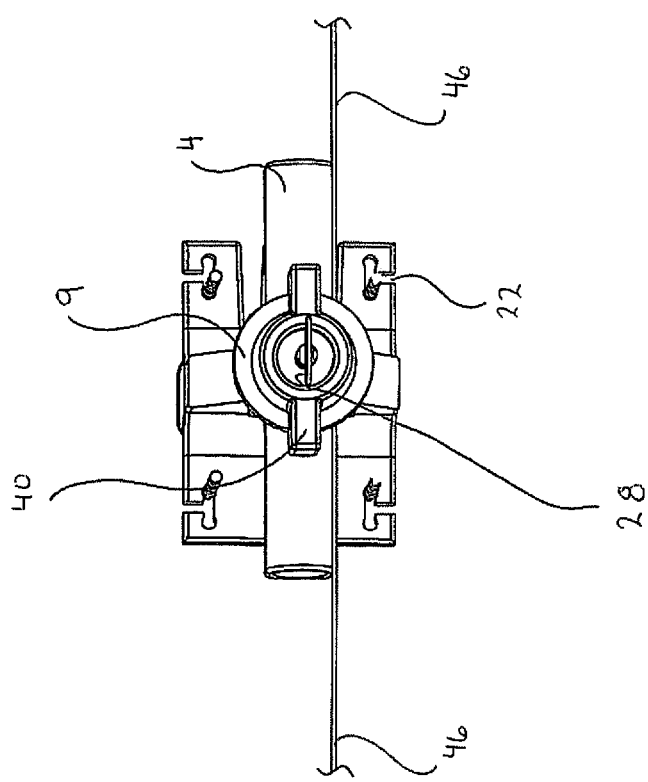
FIG. 7 is a front view of the plant hold-down bracket installed horizontally on a trellis wire.
Figure 8:
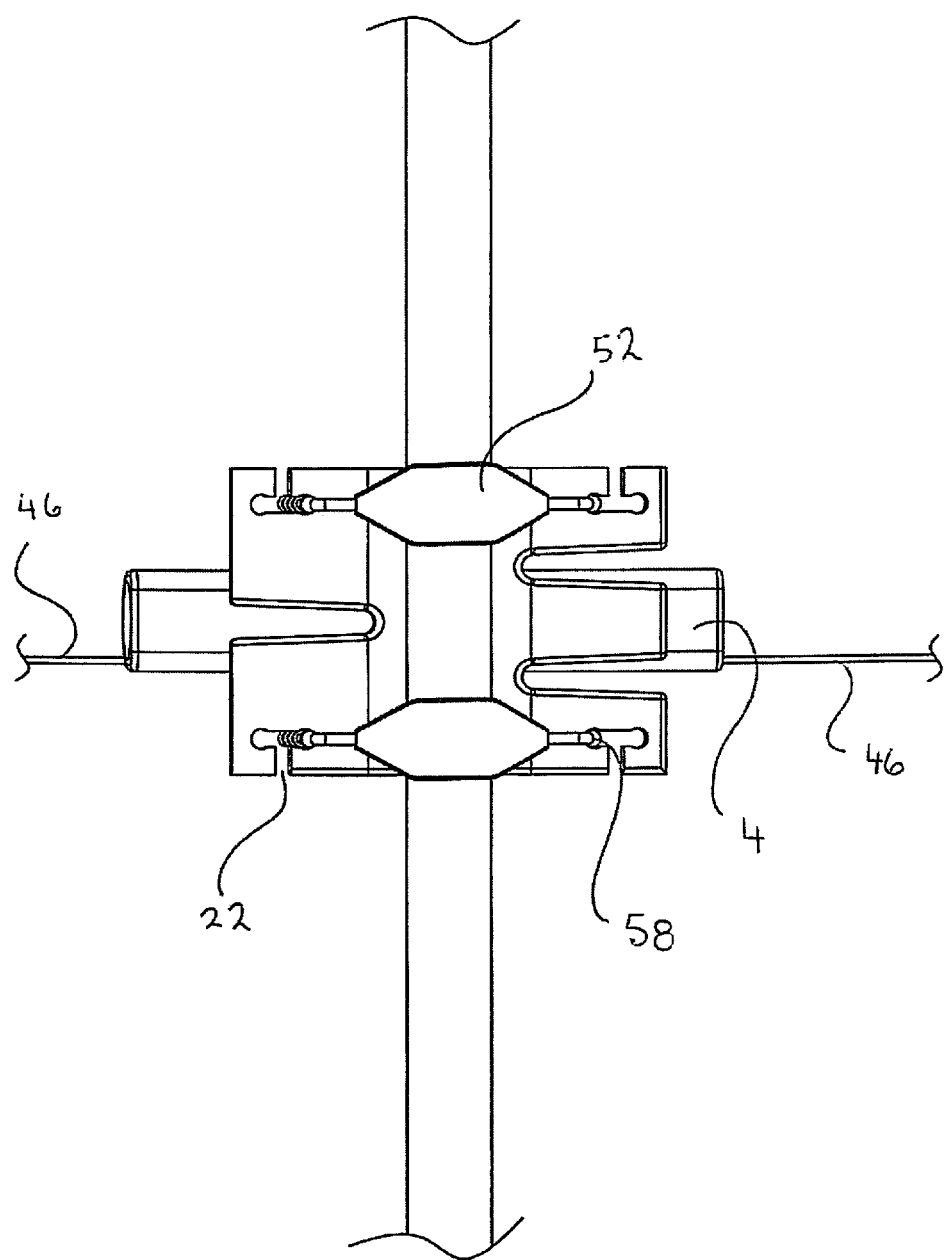
FIG. 8 is a rear view of the plant hold-down bracket installed horizontally on a trellis wire.

On the exterior thread 38 of the stud (FIG. 6) there is an internally threaded wire lock wingnut 40. There is a washer 9 integrated at the bottom of the wingnut 40. This washer 9 has a set of circumferential hemispherical teeth 42 equally radially spaced about its inner face 44. (FIGS. 1 and 2) These bite into the top of a trellis wire 46 which is laid beside the stud 8 and into one of the linear grooves 7 of the planar face of the platform 3. These linear grooves 7 are sized to trap and retain a trellis wire 46 in this manner (FIGS. 7 and 8). Although in the preferred embodiment a wingnut having two opposing tabs 48 is used, it is known that other configurations of rotatable nuts would also work, such as one with a knurled outer face for ease of tightening without any tools.

Preferably the ground stake 34 is a linear section of steel rebar, commonly found in any hardware store, although any linear member, circular in cross section, would suffice as a ground stake 34. In the preferred embodiment the ground stake 34 is a section of ½'" diameter rebar and the diameter of the bore 6 of the body 4 is slightly larger by a 1/16 or ⅛ of an inch. Rebar is used in the preferred embodiment for three reasons. First, because it has a raised surface pattern 36 that allows the thumbscrew 28 to grab the ground stake 34 better, even when the thumbscrew loosens slightly. Second, the rebar is rigid and can be hammered into the ground without sharpening one end to a point without the rebar bending. Third, it is extremely rigid and wont flex under load.

Figures 5, 9:
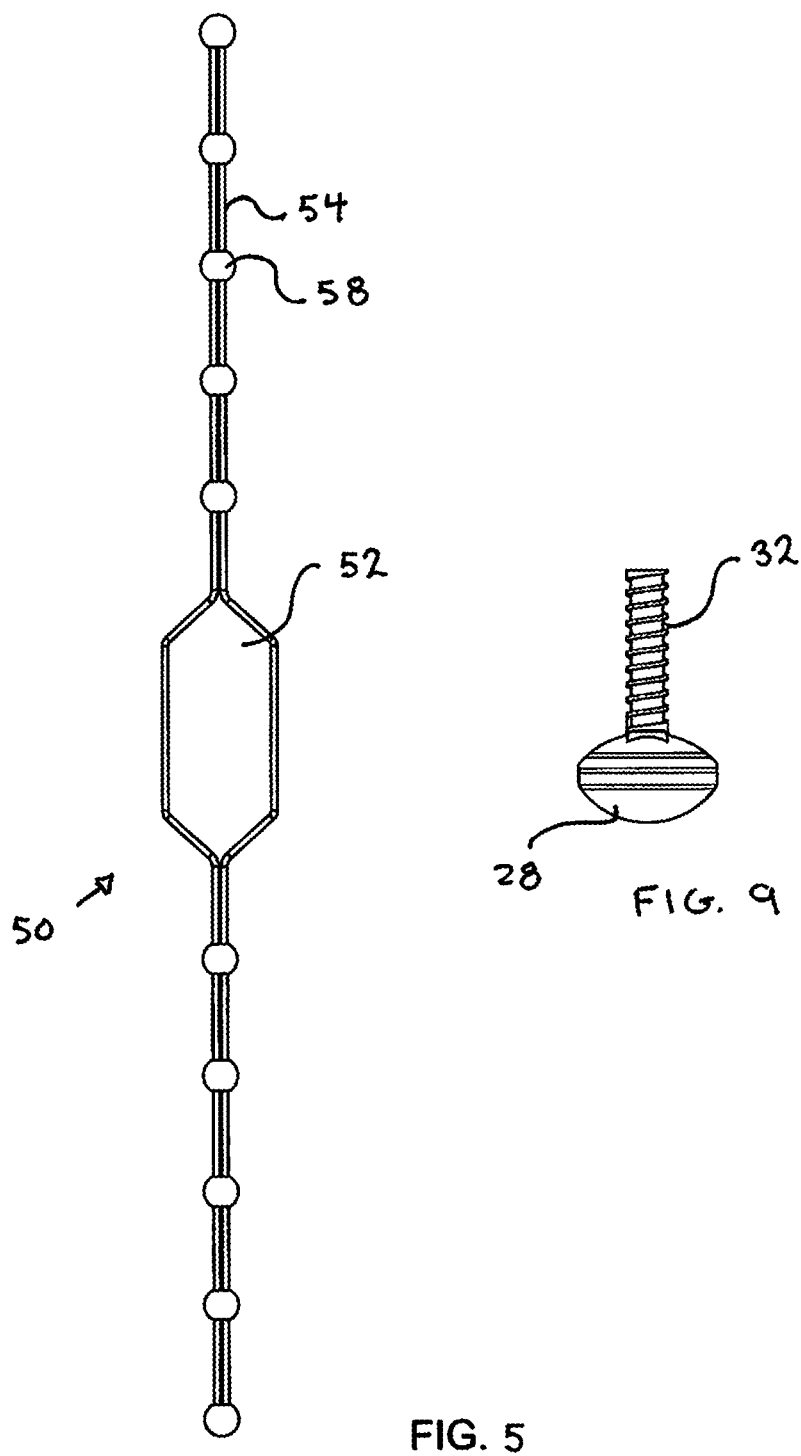
FIG. 5 is a front view of a plant securement ties.
FIG. 9 is a side view of the vertical adjustment thumbscrew.

Looking at FIGS. 5 and 8 the plant securement ties 50 can be seen. These are fabric, leather or flexible polymer slings 52 having a length that preferably exceeds their width and that have stretchable cords 54 affixed to each of its two ends 56. These cords 54 have enlarged nodes 58 spaced along their length. These nodes 58 have a diameter that exceeds the width of the T shaped slots 22 such that when the cords are stretched and fed through opposing T shaped slots, the nodes 58 will not allow the cords 54 to be pulled out or loose from the bracket plate 16.

FIGS. 6, 7 and 8 illustrate best the operation of the plant hold-down bracket 2. In operation, the plant hold-down bracket 2 may be used in a vertical orientation (FIG. 6) or a horizontal orientation on a wire trellis (FIGS. 7 and 8). In the vertical orientation, the ground stake 34 is driven into the ground adjacent the pot 60 the plant resides in, or the pot 60 the plant is about to be placed into. The bore 6 of the body 4 of the bracket 2 is slid over the ground stake 34 and the bracket 2 is lowered into the pot 60 until one edge of the bracket plate 16 resides below the top edge 62 of the pot 60 and the spacer block 14 contacts the top edge 62 firmly. The vertical adjustment thumbscrew 28 (FIG. 9) then is threading engaged with the threaded internal through-bore 30 (FIG. 7) of the stud 8 until the end of the thumbscrew 28 contacts the side of the ground stake and frictionally engages it. (The thumbscrew 28 is removed in FIG. 6 to better illustrate the design of the stud 8. It can be seen installed in FIGS. 1 and 7.) The pot 60 cannot now tip over. There is no need to install the wire lock wingnut 10 unless the bracket 2 is being installed on a trellis wire 46.

In the horizontal orientation, the pot 60 is placed adjacent to a trellis. The plant hold-down bracket 2 is positioned such that its cylindrical body 4 resides in a horizontal position. The wire lock wingnut 40 is placed atop of a trellis wire 46 that resides in the grooves 38 on the top face of the platform 3 beside the stud 8. The wingnut 40 is rotated (screwed down) such that the opposing circumferential hemispherical teeth 42 of the integrated washer 9 frictionally traps the trellis wire 46 between them and the platform 3, therein locking the bracket 2 to the trellis. The stem of the potted plant is seated in the concave linear depression 18 of the bracket plate 16 and the plant securement ties 50 are placed over the stem of the potted plant opposing the concave linear depression 18. The plant securement ties 50 have their stretchable cords 54 pulled or stretched and the cords 54 are fed in their stretched configuration through the T shaped slots 22 and then relaxed until the enlarged nodes 58 contact the sides of the T shaped slot and lock the plant securement ties 50 to the plant hold-down bracket 2. With the stem of the potted plant trapped between the bracket plate 16 and the plant securement ties 50 and the bracket 2 secured to the trellis, the potted plant cannot tip over.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A plant hold-down device to secure a potted or bagged plant from tipping over, comprising;

a cylindrical body with a linear through-bore having a contiguous inner wall formed centered along a linear axis of said body, said body having a planar platform formed on a top face thereof;

an externally and internally threaded stud extending perpendicularly from said platform of said body;

a planar bracket plate having a concave linear depression formed there across, a spacer block extending perpendicularly between said body and said bracket plate so as to hold said bracket plate at a spaced distance from said body; and a trellis wire lock mounted onto said external thread of said stud.

2. The plant hold-down device of claim 1 further comprising:

at least two slots formed therethrough said bracket plate.

3. The plant hold-down device of claim 2 wherein said at least two slots are T shaped slots.

4. The plant hold-down device of claim 2, further comprising:

an externally threaded vertical adjustment thumbscrew, rotatably engaged in said internal thread of said stud.

5. The plant hold-down device of claim 1, wherein said trellis wire lock is an internally threaded wingnut that has a washer integrated on a bottom of said wingnut, said washer having a set of teeth formed on a bottom face thereof, where said bottom face of said washer is parallel to a top face of said platform.

6. The plant hold-down device of claim 5, further comprising:

at least one plant securement tie, said plant securement tie having a central flexible sling having a first end and a second end, each said first end and said second end each having a cord affixed thereto; and wherein said plant securement tie is connectable across said bracket plate by affixation of said cords in said T shaped slots.

7. The plant hold-down device of claim 6, further comprising:

at least one spherical node formed at a point along a length of each of said cords wherein said cords are stretchable; and wherein said at least one node has a diameter that exceeds a width of said at least two T shaped slots.

8. The plant hold-down device of claim 2 further comprising;

at least one V notch formed through said bracket plate to hold the potted plant's irrigation lines off of the ground.

9. The plant hold-down device of claim 1 wherein said linear depression has a linear axis that resides perpendicular to said linear axis of said body.

10. The plant hold-down device of claim 1 wherein said planar platform on said body has a series of linear grooves formed thereon.

* * * * *